United States Patent Office 3,637,761
Patented Jan. 25, 1972

3,637,761
PROCESS FOR THE PREPARATION OF HIGH PURITY TRIMELLITIC ANHYDRIDE FROM TRIMELLITIC ACID BY THE CHEMICAL REDUCTION OF NITRO-COMPOUND IMPURITIES PRIOR TO DEHYDRATION AND DISTILLATION
Tsutomu Kuwata, Tokyo, and Syoichi Nagato and Tadashi Yamada, Iruma-gun, Japan, assignors to Daicel Ltd., Higashi-ku, Osaka, Japan
No Drawing. Filed Mar. 10, 1969, Ser. No. 805,831
Claims priority, application Japan, Mar. 14, 1968, 43/16,990
Int. Cl. C07c 63/02
U.S. Cl. 260—346.3          9 Claims

ABSTRACT OF THE DISCLOSURE

An impure trimellitic acid solution containing nitro compounds as impurities is subjected to a reduction treatment, following which it is dehydrated and distilled to obtain highly pure trimellitic anhydride.

BACKGROUND OF THE INVENTION

Field of the invention

The present invention relates to trimellitic anhydride and more particularly is concerned with a process for the preparation of high purity trimellitic anhydride from trimellitic acid. The invention has particular applicability when the trimellitic acid has been produced by the oxidation of 1,2,4-trialkylbenzene or monochloromethyl xylene with nitric acid or by a process which includes the step of oxidation with nitric acid.

Trimellitic anhydride is useful as an intermediate in the production of alkyd resins, plasticizers, hardening agents, and other organic compounds. For these applications it is necessary to remove color bodies and impurities form trimellitic anhydride prior to its use as such as intermediate in order to avoid the development of unacceptable color in the produced resins and plasticizers. A TEG (Triethylene Glycol esterification) color determination has generally been employed to characterize the purity of trimellitic anhydride and a TEG color of below 170 is often specified for trimellitic anhydride used in white or transparent resins. (The lower the TEG color value, the lower the content of the colored impurities).

According to the present invention, the process for producing high purity trimellitic anhydride from crude trimellitic acid, which has been prepared from an aromatic compound by a process including a nitric acid oxidation step, comprises treating the crude trimellitic acid by reductive methods, dehydrating said trimellitic acid and distilling the trimellitic anhydride thus formed. Crude trimellitic acid may be prepared by the oxidation of various 1,2,4-aliphatic substituted benzenes by means of several known routes. Some of these processes employ a catalytic oxidation, by molecular oxygen-containing gas, of trialkylbenzene, such as pseudocumene, in the conjoint presence of a lower carboxylate salt of cobalt or manganese and a bromide, while others involve a two-stage oxidation, with molecular oxygen-containing gas, in the presence of a cobalt or manganese salt and nitric acid, and the one-stage or two-stage nitric acid oxidation. The preparation of trimellitic acid by the nitric oxidation of chloromethylated xylene is also well known. The crude trimellitic acid which has been prepared by a process including the step of oxidation with nitric acid usually contains small amounts of undesirable materials formed by side reactions of oxidation and by nitration reactions. However, the properties of some of these impurities are inconveniently similar to those of trimellitic acid or trimellitic anhydride and, therefore, it is quite difficult to remove these impurities from trimellitic acid or trimellitic anhydride by means of the dehydration and distillation steps. The simply dehydrated and distilled product of the crude trimellitic acid still contains such impurities of 500 to 1000, as shown by a TEG color, and leads to an undesirable product when alkyd resins, plasticizers, etc. are produced.

Description of the prior art

Various methods have previously been proposed to remove such colored impurities from trimellitic acid or trimellitic anhydride. Those methods include the following: a method wherein such impurities are removed by recrystallization or extraction using water or organic solvents, a method wherein the aforesaid recrystallization or extraction is employed together with an adsorption method using activated carbon, and a method wherein acetic anhydride, $V_2O_5$, etc., are added in the dehydration step. However, the presently known processes are unsatisfactory from an economic point of view and also because they do not effect the desired reduction in the TEG color.

We have investigated the impurities contained in the crude trimellitic acid. Nitro compounds, such as picric acid and 3,4-dinitrobenzoic acid, were identified as the main components of these color bodies. Various efforts to remove these nitro compounds resulted in the discovery of the process of the present invention.

SUMMARY OF THE INVENTION

According to the process of this invention, the crude trimellitic acid obtained by a process which includes the step of oxidation with nitric acid is first treated by one of the conventional reduction methods which have been generally used for the reduction of nitro compounds to amines or hydroxylamines. Those methods are (1) an aqueous solution of the crude trimellitic acid is reduced in the presence of metal, such as iron, zinc or tin, or a lower valence salt of a metal having a variable valence state, such as stannous chloride or ferrous chloride, with a mineral acid, such as hydrochloric acid or sulfuric acid, or an organic acid, such as acetic acid; (2) an aqueous alkali salt solution of the crude trimellitic acid is reduced in the presence of metal, such as iron or zinc, with a basic compound, such as sodium hydroxide, potassium hydroxide, or ammonia; or (3) a solution of the crude trimellitic acid dissolved in water or an organic solvent such as an alcohol or an organic acid is reduced in the presence of catalyst, such as a Raney nickel catalyst, Urushibara nickel catalyst, or platinum oxide catalyst. Secondly, the trimellitic acid is recovered conventionally through several steps, such as cooling, distilling off the solvent, acid salting and water washing, etc. Then the trimellitic acid thus recovered is heated to a temperature higher than the melting point thereof to carry out the dehydration, and finally the trimellitic acid anhydride is distilled under a reduced pressure to obtain the high purity product.

In the practice of the present invention, wherein the solution of the crude trimellitic acid is subjected to the aforesaid liquid-phase reduction treatment, only the nitro compounds are reduced without substantially affecting the trimellitic acid, the reduced impurities are completely left in the distillation pot in the subsequent distillation step, and little or no impurities are found in the distilled trimellitic anhydride.

Although the detailed reaction mechanisms of the aforesaid reducing treatment have not yet been clearly established, experimental results have confirmed that no reduction of the trimellitic acid occurs during the reduction step and only the nitro groups of the nitro compounds are reduced to form hydrophilic aromatic amino compounds and aromatic hydroxylamine compounds. The process has been studied to obtain most economically trimellitic anhydride from the treatment mixture by means of the reduction method. We have found that the unexpected and remarkable results mentioned above can be obtained by either (a) cooling the solution of the reduction product, recovering the crystals thus precipitated by filtration, drying the product if necessary, charging the trimellitic acid thus obtained into a distillation vessel, dehydrating the acid by heating it at a predetermined temperature under a reduced pressure, and distilling the contents in the same vessel to obtain trimellitic anhydride, or (b) distilling the reduction product solution in a distillation system in order to distil off the water contained therein and then subjecting it to the same dehydration and distillation procedures as mentioned in above (a).

The high purity trimellitic anhydride thus obtained contains no nitrogenous compounds and, remarkably, the TEG color can be reduced to 30–50. In other words, an extremely high purity product, that has never been obtained industrially by conventional methods, can be obtained by the process of the present invention.

The crude trimellitic acid which is used in the process of this invention can be that which has been produced by the oxidation of a 1,2,4-trialkylbenzene or monochloromethylated products of xylenes with nitric acid or by a process which includes the step of oxidation with nitric acid.

In the above-mentioned reduction treatment process (1) or (2), the amount used of the aforesaid metal or the lower valence salt of a metal having a variable valence state depends on the amount of the nitro compounds contained in the crude trimellitic acid (said amount of the nitro compounds can be quantitatively determined by nitro group analysis or by a nitrogen content analysis) and is preferably larger than the stoichiometric amount of the nitro compounds. The amount of the metal or lower valence salt suitable in practice is 1–10 times the stoichiometric amount of the nitro compounds, preferably, about 1–2 times. Also, the amounts of acids and bases used in the process are preferably larger than the stoichiometric amounts necessary to generate hydrogen by the reaction thereof with the metal or the lower salt added or forming a double salt therewith, but these amounts are not critical.

Furthermore, the amount of water used as the solvent in the process of this invention must be sufficient to dissolve the crude trimellitic acid and, accordingly, it depends on the temperature of operation. Although large quantities of water can be used for dissolving crude trimellitic acid and are effective for the purification of trimellitic acid, the product loss into the filtrate during the precipitation of trimellitic acid after the reduction is increased. Therefore, in the aforesaid reduction process (1) or (2), it is desired that the temperature of operation be as high as possible (for instance, about 100° C.). The suitable proportion of water for use under these conditions is about 1–2 times the amount necessary for dissolving crude trimellitic acid. The period of time required for carrying out either one of these processes depends on, in general, the quality of the crude trimellitic acid to be processed, but the time required usually is about 5–90 minutes.

When the aforesaid conventional catalytic reduction method (3) is used for carrying out the process of this invention, the amount of catalyst used is preferably about 0.1–10% by weight, based on the weight of the crude trimellitic acid. The amount of solvent used should be preferably the minimum amount necessary for dissolving the crude trimellitic acid.

The liquid reaction products from these reduction processes must be subjected to a suitable pretreatment prior to the subsequent purification step. That is, the liquid reduction product from the aforesaid reduction process (1) may be introduced into the subsequent purification step as it is, but it is necessary that the liquid reduction product from the process (2) should be acidified with a mineral acid so as to liberate free trimellitic acid and, also, the reduction product liquid from the process (3) should be filtered to remove or recover the catalyst used in the reduction process.

The treated liquid reaction product is subjected to the dehydration step of trimellitic acid and then to a distillation step. For this purpose, the crystals of trimellitic acid are recovered by cooling the reaction liquid, followed by filtration or by drying under evaporation as it is, then the crystals of trimellitic acid are dehydrated by heating them to a temperature higher than the melting point (215–217° C.) of trimellitic acid, under normal pressure or a reduced pressure, and the trimellitic anhydride thus prepared is heated in a distillation vessel at a temperature in the range of about 230–240° C. and under a reduced pressure of, for example, 5–10 mm. Hg, so that the trimellitic anhydride is not decomposed, whereby high purity trimellitic anhydride having a TEG color of less than 170 is obtained.

As mentioned above, according to the process of this invention, very high purity trimellitic anhydride can be obtained at a low cost. This has never been attained by any conventional methods. The process of this invention and the aforesaid advantages thereof are further illustrated by the following examples, in which all parts and percentages are by weight unless otherwise indicated.

EXAMPLE 1

A mixture of 25 parts of water and 10 parts of crude trimellitic acid was heated to 100° C. to dissolve the crude trimellitic acid. The crude trimellitic acid used above contained such nitro compounds as picric acid and 3,4-dinitrobenzoic acid in a proportion of 0.18%, calculated as nitrogen, and had a total acid content of 98.2%, calculated as trimellitic acid. To the hot aqueous solution of crude trimellitic acid were added 0.25 part of iron powder and 2.0 parts of 35% hydrochloric acid and the mixture was maintained at 100° C. for one hour with stirring. Thereafter, the system was cooled to 20° C. and crystals precipitated were recovered by filtration and dried. The trimellitic acid thus recovered was charged into a distillation still and was heated to 230–240° C. under a pressure of 50–100 mm. Hg to dehydrate the trimellitic acid and, after converting the dehydration system to a distillation system for the trimellitic anhydride, the distillation was conducted at 230–240° C. under a pressure of 4–5 mm. Hg, whereby 7.0 parts of trimellitic anhydride was obtained. The purity, the nitrogen content, and the value of TEG color test of the trimellitic anhydride thus obtained were 99.9%, 0.00% and 30, respectively.

COMPARISON EXAMPLE 1

(No reduction treatment)

Into a distillation still was charged 10 parts of the crude trimellitic acid as employed in Example 1. The compound was heated to 230–240° C. under a pressure of 50–100 mm. Hg to dehydrate the trimellitic acid and thereafter the trimellitic anhydride was distilled at 230–240° C. under a pressure of 4–5 mm. Hg to obtain 7.5 parts of trimellitic anhydride. The purity, the nitrogen content, and the value of TEG color test of the trimellitic anhydride were 99.5%, 0.08% and 1000, respectively.

COMPARISON EXAMPLE 2

(Recrystallization by an aqueous solution was carried out instead of the reduction treatment)

A mixture of 30 parts of water and 10 parts of crude trimellitic acid as employed in Example 1 was heated to 100° C. to dissolve the crude trimellitic acid and thereafter the resultant solution was cooled to 20° C. to precipitate the crystals of trimellitic acid, which was filtered and dried. The trimellitic acid thus obtained was subjected to dehydration and distillation as in Example 1 to obtain 5.8 parts of trimellitic anhydride. The purity, the nitrogen content, and the value of TEG color test of the trimellitic anhydride were 99.3%, 0.06% and 700, respectively.

EXAMPLE 2

A mixture of 20 parts of crude trimellitic acid and 50 parts of water was heated to 100° C. to dissolve the crude trimellitic acid. The crude trimellitic acid employed contained nitro compounds such as picric acid and 3,4-dinitrobenzoic acid in a proportion of 0.21%, calculated as nitrogen and had a total acid content of 97.4%, calculated as trimellitic acid. The aqueous solution of the crude trimellitic acid was mixed with one part of zinc powder and 4 parts of 35% hydrochloric acid and the resultant mixture was maintained at 100° C. for 39 minutes with stirring and then cooled to 15° C. to precipitate the crystals of trimellitic acid, which were recovered by filtration, washed with 50 parts of cold water and dried. The crystals thus dried were then subjected to the dehydration and distillation steps in the same manner as in Example 1 to obtain 13.6 parts of trimellitic anhydride. The purity, the nitrogen content, and the value of color test of the trimellitic anhydride thus obtained were 99.8%, 0.00% and 50, respectively.

EXAMPLE 3

A mixture of 20 parts of crude trimellitic acid as employed in Example 2 and 50 parts of water was heated to 100° C. to dissolve the acid. After adding to the aqueous solution one part of tin powder and 10 parts of 35% hydrochloric acid, the resultant mixture was maintained at 100° C. for 90 minutes with stirring and cooled to 20° C. to precipitate the crystals of trimellitic acid, which were recovered by filtration and dried. The trimellitic acid thus obtained was subjected to the dehydration and distillation steps in the same manner as in Example 1 to obtain 12.4 parts of trimellitic anhydride. The purity, the nitrogen content, and the value of TEG color test of the trimellitic anhydride were 99.6%, 0.00% and 40, respectively.

EXAMPLE 4

A mixture of 20 parts of the crude trimellitic acid as employed in Example 2 and 50 parts of water was heated to 100° C. to dissolve the acid and after adding 4.4 parts of $SnCl_2 \cdot 2H_2O$ and 5 parts of 35% hydrochloric acid, the resultant mixture was maintained at 100° C. for 30 minutes with stirring and thereafter cooled to 15° C. to precipitate the crystals of trimellitic acid, which were recovered by filtration, washed with 25 parts of cold water, and dried. The trimellitic acid thus obtained was subjected to the dehydration and distillation steps in the same manner as in Example 1 to obtain 14.51 parts of trimellitic anhydride. The purity, the nitrogen content, and the value of TEG color test of the trimellitic anhydride were 99.8%, 0.00% and 60, respectively.

COMPARISON EXAMPLE 3

(Activated carbon treatment was applied instead of the reduction treatment)

A mixture of 20 parts of the crude trimellitic acid, as in Example 2, and 50 parts of water was heated to 100° C. to dissolve the acid and after adding one part of activated carbon powder to the solution, the resultant mixture was maintained at 100° C. for 30 minutes with stirring and then cooled to 15° C. to precipitate the crystals of trimellitic acid, which were recovered by filtration and dried. The trimellitic acid thus recovered was subjected to the dehydration and distillation steps as in Example 1 to obtain 13.2 parts of trimellitic anhydride.

The purity, the nitrogen content, and the value of TEG color test of the trimellitic anhydride were 99.4%, 0.04% and 350, respectively.

EXAMPLE 5

A solution of 15 parts of 90% sodium hydroxide in 30 parts of water was added to 20 parts of crude trimellitic acid to dissolve the acid in the solution. The crude trimellitic acid employed above contained nitro compounds such as picric acid and 3,4-dinitrobenzoic acid in a proportion of 0.11%, calculated as nitrogen, and had a total acid content of 97.3%, calculated as trimellitic acid. The aqueous sodium hydroxide solution of crude trimellitic acid was heated to 100° C. and after adding one part of zinc powder, the resultant mixture was maintained at 100° C. for 30 minutes with stirring. Thereafter, 40 parts of 35% hydrochloric acid was added to the system to liberate trimellitic acid and the system was cooled to 15° C. to precipitate the crystals of trimellitic acid, which were recovered by filtration and dried. The trimellitic acid obtained was subjected to the dehydration and distillation steps in the same manner as in Example 1 to obtain 93 parts of trimellitic anhydride. The purity, the nitrogen content, and the value of TEG color test of the trimellitic anhydride were 99.7%, 0.00% and 50, respectively.

EXAMPLE 6

A mixture of 10 parts of crude trimellitic acid as employed in Example 2 and 50 parts of water was heated to 80° C. to dissolve the acid and after adding 0.25 part of a Urushibara Ni catalyst to the solution, the catalytic reaction was conducted at 80° C. During 15 minutes, 0.0039 part of hydrogen was absorbed, when the reaction stopped.

The reaction liquid was filtered to remove the catalyst and the filtrate was concentrated by evaporating 25 parts of water and cooled to 15° C. to precipitate the crystals of trimellitic acid, which were recovered by filtration, washed with 25 parts of cold water and dried. The trimellitic acid was subjected to the dehydration and distillation steps in the same manner as in Example 1 to obtain 7 parts of trimellitic anhydride. The purity, the nitrogen content and the value of TEG color test were 99.8%, 0.02% and 150, respectively.

The embodiments of the invention in which an exclusive property or privilege is claimed are defined as follows:

1. A process for the preparation of high purity trimellitic anhydride from crude trimellitic acid containing nitro compounds as impurities, which crude trimellitic acid has been prepared by a process including a nitric acid oxidation step, which comprises the steps of dissolving the crude trimellitic acid in water or an organic solvent to form a solution, subjecting the solution at a temperature of not substantially in excess of 100° C. to a liquid phase chemical reducing reaction to add hydrogen to the nitro compounds and thereby reduce the nitro groups to amino and hydroxylamino groups, recovering from the reaction solution the trimellitic acid, then heating the trimellitic acid to a temperature above the melting point of trimellitic acid to dehydrate the trimellitic acid and then distilling under a sub-atmospheric pressure the trimellitic acid anhydride thus formed.

2. The process as claimed in claim 1 wherein said nitro compounds are picric acid and 3,4-dinitrobenzoic acid.

3. The process as claimed in claim 1 wherein said reducing reaction is carried out by adding to an aqueous solution of the crude trimellitic acid a member selected from the group consisting of iron, zinc, tin, stannous chloride and ferrous chloride in an amount in the range of 1 to 10 times the stoichiometric amount of the nitro compounds and a member selected from the group consisting of hydrochloric acid, sulfuric acid and acetic acid.

4. The process as claimed in claim 1 wherein said reducing reaction is carried out by adding to an aqueous alkali salt solution of the crude trimellitic acid a member selected from the group consisting of iron and zinc in an amount in the range of 1 to 10 times the stoichiometric amount of the nitro compounds and a member selected from the group consisting of sodium hydroxide, potassium hydroxide and ammonia.

5. The process as claimed in claim 1 wherein said reducing reaction is carried out by adding to a solution of the crude trimellitic acid in a solvent selected from the group consisting of water, alcohol and an organic acid, a catalyst selected from the group consisting of a Raney nickel catalyst, Urushibara nickel catalyst and platinum oxide catalyst in an amount in the range of from 0.1 to 10% by weight based on the weight of the crude trimellitic acid.

6. The process as claimed in claim 4 in which the reduction product liquid is acidified by a mineral acid before it is subjected to the subsequent dehydration and distillation steps.

7. The process as claimed in claim 5 in which the reduction product liquid is filtered to remove the catalyst used before it is subjected to the subsequent dehydration and distillation steps.

8. The process as claimed in claim 1 wherein the trimellitic acid recovered from the reduction product is dehydrated by heating it under a normal pressure or a reduced pressure to a temperature higher than the melting point of trimellitic acid.

9. The process as claimed in claim 1 wherein the trimellitic acid anhydride formed by the dehydration is distilled under a reduced pressure of 5–10 mm. Hg and at a temperature of 230–240° C.

References Cited
UNITED STATES PATENTS 2,998,431  8/1961  McKinnis et al. ____ 260—346.4
3,261,846  7/1966  Meyer _____ 203—69

FOREIGN PATENTS 1,287,145  1/1962  France.

WILBUR L. BASCOMB, JR., Primary Examiner

U.S. Cl. X.R.

260—346.4, 524; 203—15, 32, 34, 35, 36, 37, 47, 48, 91